(12) United States Patent
Haynes et al.

(10) Patent No.: US 9,177,298 B2
(45) Date of Patent: Nov. 3, 2015

(54) ABBREVIATED USER INTERFACE FOR INSTANT MESSAGING TO MINIMIZE ACTIVE WINDOW FOCUS CHANGES

(75) Inventors: Thomas R. Haynes, Apex, NC (US); Steven K. Ma, San Jose, CA (US); Lin Sun, Morrisville, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 473 days.

(21) Appl. No.: 12/638,691

(22) Filed: Dec. 15, 2009

(65) Prior Publication Data

US 2011/0145744 A1   Jun. 16, 2011

(51) Int. Cl.
| | |
|---|---|
| H04L 12/58 | (2006.01) |
| G06Q 10/10 | (2012.01) |
| G06F 3/0481 | (2013.01) |

(52) U.S. Cl.
CPC ............ *G06Q 10/107* (2013.01); *G06F 3/0481* (2013.01); *G06F 3/04817* (2013.01); *H04L 12/581* (2013.01); *H04L 51/04* (2013.01)

(58) Field of Classification Search
CPC . H04L 41/5093; H04L 41/026; H04L 12/581; H04L 12/2495; H04L 51/04; H04L 65/00; H04N 1/00472; H04N 1/00432; G06F 3/0481; G06F 3/04817; G06F 8/34; G06Q 10/107
USPC ........................................................ 715/758
See application file for complete search history.

(56) References Cited

U.S. PATENT DOCUMENTS

| | | | |
|---|---|---|---|
| 5,617,526 A | 4/1997 | Oran et al. | |
| 5,892,511 A * | 4/1999 | Gelsinger et al. | 715/794 |
| 6,895,430 B1 * | 5/2005 | Schneider | 709/217 |
| 6,907,447 B1 * | 6/2005 | Cooperman et al. | 709/203 |
| 7,346,855 B2 * | 3/2008 | Hellyar et al. | 715/783 |
| 7,370,277 B1 * | 5/2008 | Canfield et al. | 715/752 |
| 7,548,955 B2 | 6/2009 | Nicholas, III | |
| 7,734,704 B2 * | 6/2010 | Chen et al. | 709/206 |
| 2002/0140732 A1 * | 10/2002 | Tveskov | 345/763 |

(Continued)

FOREIGN PATENT DOCUMENTS

| | | |
|---|---|---|
| CN | 1855828 A | 11/2006 |
| CN | 101356498 A | 1/2009 |

(Continued)

*Primary Examiner* — Shen Shiau
(74) *Attorney, Agent, or Firm* — Patents on Demand P.A.; Brian K. Buchheit; Scott M. Garrett (57) ABSTRACT

An abbreviated user interface for instant messaging (or other type of communications occurring in a graphical user interface environment permitting concurrent running of multiple application) is provided. The abbreviated user interface is different from a related primary user interface and is presented when the primary user interface is instantiated, yet is not on top of a z-order of a graphical environment. The abbreviated user interface can be a light-weight one that permits a user to quickly read messages. In one embodiment, a user can create outgoing messages using the abbreviated user interface. Presentation of the abbreviated user interface can require a user action, such as hovering a pointer over a task bar element for a duration or pressing a hot-key combination. In one embodiment, presentation of an otherwise unread message within the abbreviated interface for a designated time can cause the message to be marked as read.

25 Claims, 5 Drawing Sheets

(56) References Cited

U.S. PATENT DOCUMENTS

| | | | |
|---|---|---|---|
| 2003/0197730 A1* | 10/2003 | Kakuta et al. | 345/758 |
| 2004/0078444 A1* | 4/2004 | Malik | 709/206 |
| 2004/0098462 A1* | 5/2004 | Horvitz et al. | 709/207 |
| 2004/0268261 A1* | 12/2004 | Elliott et al. | 715/716 |
| 2005/0044058 A1* | 2/2005 | Matthews et al. | 707/1 |
| 2005/0055416 A1 | 3/2005 | Heikes et al. | |
| 2005/0080866 A1* | 4/2005 | Kent et al. | 709/207 |
| 2006/0041629 A1* | 2/2006 | Lira | 709/206 |
| 2006/0101350 A1 | 5/2006 | Scott | |
| 2006/0123353 A1* | 6/2006 | Matthews et al. | 715/779 |
| 2006/0173966 A1* | 8/2006 | Jennings et al. | 709/207 |
| 2007/0006094 A1* | 1/2007 | Canfield et al. | 715/781 |
| 2007/0022172 A1* | 1/2007 | Anglin et al. | 709/207 |
| 2007/0094342 A1* | 4/2007 | Bostick et al. | 709/207 |
| 2007/0094360 A1 | 4/2007 | Forlenza et al. | |
| 2008/0028026 A1* | 1/2008 | Chen et al. | 709/206 |
| 2008/0028324 A1 | 1/2008 | Coutts | |
| 2008/0052637 A1 | 2/2008 | Ben-Yoseph et al. | |
| 2008/0102863 A1* | 5/2008 | Hardy et al. | 455/466 |
| 2008/0129469 A1 | 6/2008 | Sumner et al. | |
| 2008/0147795 A1 | 6/2008 | Heidloff et al. | |
| 2008/0307322 A1 | 12/2008 | Stochosky et al. | |
| 2009/0005011 A1* | 1/2009 | Christie et al. | 455/412.2 |
| 2009/0006979 A1* | 1/2009 | Callanan et al. | 715/751 |
| 2009/0240775 A1* | 9/2009 | Otaki | 709/206 |
| 2009/0249240 A1 | 10/2009 | Lundy et al. | |
| 2010/0306669 A1* | 12/2010 | Della Pasqua | 715/752 |

FOREIGN PATENT DOCUMENTS

| | | |
|---|---|---|
| TW | 200638222 A | 11/2006 |
| WO | 2007063041 A1 | 6/2007 |

* cited by examiner

| Configure Abbreviated Interface of Communication Application 300 | _ ☐ ✕ |
|---|---|

Open Abbreviated Interface When:  Section 310
- ☒ Hover Pointer over Taskbar Element for: [2.5 Sec ▼]
- ☒ Enter HotKey Combination of: [FUNCTION+SHIFT+A ▼]
- ☐ Automatic when Message arrives of Importance Level: [High ▼]

Do Not Open Abbreviated Interface When:  Section 320
- ☒ Communication Window has Focus (Is on Top)
- ☐ Communication Window Is Not Obscured

Close Abbreviated Interface When:  Section 330
- ☒ Pointer Leaves Taskbar Element Region
- ☒ Enter HotKey Combination of: [FUNCTION+SHIFT+A ▼]
- ☐ Send Outgoing Message via Abbreviated Interface

Abbreviated Interface Functionality:  Section 340
- ☒ Show Unread Messages
- ☒ Show Read Messages
- ☒ Allow Outgoing Messages
- ☒ Handle Grouped Task Bar Element (Multiple Instances per TaskBar Element)
  - ○ Show all when enabled
  - ● Show all new messages
  - ○ Menu Expand based on Session
- ☒ Mark Unread Messages as Read after: [5 Sec ▼]
- ☐ Show Message Author on Message LHS
- ☐ Show Time Send on Message RHS
- ☒ Distinguish Unread from Read Messages: [Different Font Size & Color ▼]

New Message Indicator:  Section 350
- ☒ In Taskbar Element
- ☐ In Communication Window
- ☒ Audible Tone

[APPLY]  [CANCEL]

ABBREVIATED USER INTERFACE FOR INSTANT MESSAGING TO MINIMIZE ACTIVE WINDOW FOCUS CHANGES

BACKGROUND

The present invention relates to the field of user interfaces and communication applications and, more particularly, to an abbreviated user interface for instant messaging (or other type of communication) to minimize active window focus changes.

A graphical user interface desktop can be a busy interactive space acting as a hub for human-to-machine interactions. This is especially true for multitasking environments, where a human user often has multiple windows open concurrently. For example, it is common to have a word processing window, a communication window, and a browser window open, where a user is simultaneously interacting across the different windows. This situation can be even more dynamic for large collaboration efforts where users use one or more means to communicate with others while accessing programs and data needed for the communication sessions.

In this environment, users engaging in instant messaging (IM), chatting, teleconferencing, and other computer-assisted communication means are often constantly toggling between one application and another. Another option is to minimize an IM window when working within a different application and restoring the IM window to read and respond to an IM message. A constant process requiring minimizing/restoring or toggling can be distracting to users and can decrease the overall user experience.

BRIEF SUMMARY

In one aspect of the disclosure, a manual user action made within a graphical desktop environment of a computing device can be detected. The graphical desktop environment can include a set of different application windows, each corresponding to an active application instance. One of the application windows can be a communication window for an instance of a communication application, which permits real-time communications over a network between at least two people. The communication window is not on top of a z-order of the graphical desktop environment. The z-order can refer to an order for activate applications within a multi-tasking graphical environment, where an application at the top of the z-order is also referred to having focus. A window having focus is a window to which user interactions via input peripherals (e.g., mouse, keyboard, etc.) are directed. Thus, the communication window (not on top of the z-order) is one lacking focus, which may be at least partially visually obscured by other active windows (having a more favorable z-order value). Responsive to the manual user action, an abbreviated user interface can be displayed next to a task bar element of the communication application instance. The abbreviated user interface can have focus and can be placed on top of the z-order of the graphical user interface. The abbreviated user interface can have a small-footprint interface relative to the communications window. The abbreviated user interface can lack interface elements of the communications window. The abbreviated user interface can be concurrently active with the communications window and can provide a non-comprehensive subset of functionality compared to functionality of the communications window. At least one previously unread text message of the communication application instance can be presented within the abbreviated user interface without altering the z-order of the communication window relative to the other ones of the different application windows. When the unread text message is presented within the abbreviated user interface for at least a previously determined duration, the text message can be marked as read for the application instance. This can cause the text message to be marked as read within the communication interface. A close event can be detected to close or hide the abbreviated application window. Responsive to the close event, the abbreviated user interface can be removed from the graphical desktop environment. Upon removal, the z-order of the set of different application windows can remain unchanged from a state existent before the manual user action was detected.

In another aspect of the disclosure, a computer desktop of a graphical user interface of a computing device can include a set of windows and an abbreviated interface. Each of the windows can be for a different application instance. One of the windows can be a communication application window for a communication application instance. At least one window can be positioned on top of the communication application window within the z-order of the computer desktop. The abbreviated application interface can be an additional interface for the communication application instance. The abbreviated application interface can have a different graphical element layout than the communication application window. The abbreviated application interface can present textual content of unread messages received by the communication application instance. The abbreviated application instance can be positioned on top of the set of windows within the z-order of the desktop interface. Content presented within the abbreviated application interface can be concurrently available within the communication application window, which is at least partially obscured by other ones of the windows.

Another aspect of the invention can be for a communication application operable to exchange real-time or near-real-time text based communications over a network with at least one remotely located devices. The communication application can include a communication application window, an abbreviated user interface, and code. The communication application window can be operable as a graphical user interface for users to input text and to display text, where the input text and display text is text of the exchanged text based communications. The abbreviated user interface is operable as a graphical user interface for users to view at least a portion of the display text. The abbreviated user interface can lack interface elements of the communications application window. The abbreviated user interface can be concurrently active with the communications application window and can provide a non-comprehensive subset of functionality compared to functionality of the communications application window. The code can be operable to present the abbreviated user interface responsive to a manual action performed within a desktop environment by a user of the desktop environment.

DETAILED DESCRIPTION

The disclosure provides an abbreviated user interface for instant messaging (or other type of communications occurring in a desktop environment). The abbreviated user interface is different from a related primary user interface (e.g., an Instant Messaging Application Window) and is presented when the primary user interface is instantiated, yet is not on top of a z-order of a computer desktop. The abbreviated user interface can be a light-weight one that permits a user to quickly read new messages (or portions thereof). In one embodiment, a user can create outgoing messages (short responses, for example) using the abbreviated user interface. Presentation of the abbreviated user interface can require a user action, such as hovering a pointer over a task bar element for a duration or pressing a hot-key combination. The requirement of a user action is significant since automatic presentation of popup windows (as performed by some notifiers) can be distracting to a multi-tasking user. In one embodiment, presentation of an otherwise unread message within the abbreviated interface for a designated time can cause the message to be marked as read.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
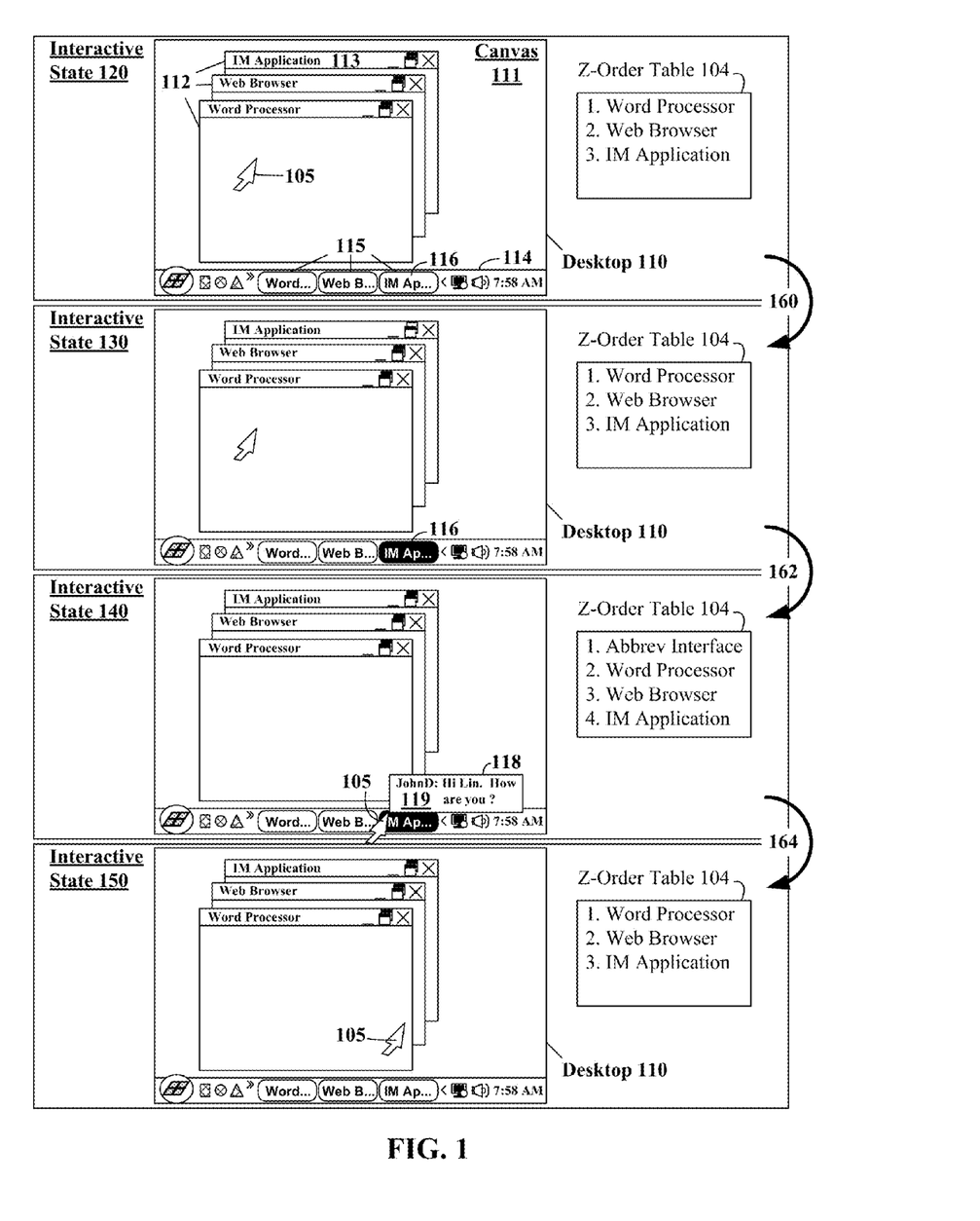
FIG. 1 shows a diagram of a set of interactive states for a computing desktop implementing an abbreviated communication interface in accordance with an embodiment of the inventive arrangements disclosed herein.

FIG. 1 shows a diagram 100 of a set of interactive states 120, 130, 140, 150 for a computing desktop 110 implementing abbreviated user interface 118 in accordance with an embodiment of the inventive arrangements disclosed herein. The computing desktop 110 can be a graphical user interface environment for any multi-tasking (e.g., allowing concurrent running of multiple applications) computing device, which includes personal computers, mobile phones, embedded devices, and the like. The abbreviated interface 118 can be an abbreviated (light-weight) interface (implemented as a flyover popup in one embodiment) of a communication application (an instant messaging (IM) or chat application in one embodiment). Presentation of the flyover 118 can require an active user action, such as positioning a pointer over a taskbar 114 element 116 of the communication application (e.g., IM application 113). The abbreviated interface permits a user to view and/or reply to a short communication (e.g., an IM entry) without changing focus to a primary window 113 associated with the communication application. Use of the abbreviated interface 118 permits quick communication viewing/responding with minimal disruption to the desktop 110.

The computing desktop 110 can be one that includes multiple concurrently active windows 112, each having a corresponding taskbar 114 element 115 associated with it. Each window 112 can be an interface instance for a corresponding software application. As shown in FIG. 1, windows 112 are presented for a word processing application, a Web browser, and an instant messaging application (windows 113). Taskbar elements 115 need not be discretely displayed within the taskbar 114, but can be grouped by application type.

Within the desktop canvas 111, an order for active applications can exist, which can be detailed in a z-order table 104. In the illustrative example of diagram 100, an initial z-order for interactive state 120 can be for the word processing application, the Web browser, then the instant messaging application. Human interactions via input peripherals (e.g., mouse, keyboard, etc.) are directed to an application at the top of the z-order, which is also referred to as an application having focus. Thus, in interactive state 120, key press input is directed to the word processing application. The computing desktop 110 can provide multiple options to permit a user to alter the z-order 120. For example, a key sequence of ALT-TAB typically permits a user to cycle through the z-order and to select an active application that should be placed on top of the z-order table 120 (and thus be given focus). A user can also move a mouse pointer 105 over a window 112 and select it, which brings that window to the front of the z-order. A user can also select a task-bar element 115 with the pointer 105, which causes a corresponding window 112 to be placed on top of the z-order.

When a window of the communication application 113 is not at the top of the z-order (lacks focus), a communication event 160 for a new communication can be detected and processed. Responsive to this event 160, the taskbar element 116 of the communication application can visually change, as shown by state 130, to apprise the user of desktop 110 that an unread communication has been received. In interactive state 130, no change occurs to the z-order table 104.

Subsequent to the communication event 160, a user can perform an active action 162 to activate an abbreviated communication interface 118, which changes interactive state 130 to interactive state 140. It is significant that the abbreviated interface 118 is not automatically shown responsive to the event 160, as an automatic notifier can be distracting to a user, which is contrary to the purpose of the present disclosure of providing a minimally intrusive and minimally distracting mechanism for users to interact with an active communication application that lacks focus.

A number of different active actions 162 can trigger a change to state 140. In one embodiment, a user can position a pointer over a taskbar element 116 for at least n-seconds, which triggers a presentation of interface 118. In another embodiment, a user can input a previously defined key press combination (FUNCTION+A, for example), which causes interface 118 to appear in desktop 110.

Regardless, in state 140, the abbreviated interface 118 is presented within the desktop 110. Interface 118 can be presented on top of other interfaces, shown by an entry for the abbreviated interface 118 being added as a topmost entry of z-order table 104. In one embodiment, abbreviated interface 118 is not a duplication or thumbnail image of window 113. Instead, the abbreviated interface 118 is a unique user interface for presenting content 119 to a user in a small footprint region of desktop 110. For example, a relatively large font and simplistic presentation of content 119 can occur for interface 118 to make it easy for a user to quickly digest the content 119. In contrast, thumbnail views of a window 113 can be visually crowded and difficult to read without opening a full window (i.e., changing focus to the communication window 113), which results in change of the z-order of table 104, which is a situation the present disclosure is explicitly designed to minimize a need for.

Another active user action 164 can result in the abbreviated interface 118 being no longer shown in desktop 110, which is a change from interactive state 140 to interactive state 150. In one embodiment, action 164 can include a movement of a mouse pointer outside a display region of taskbar element 116 and/or interface 118. In another embodiment, action 164 can be associated with a key press sequence. Regardless, state 150 can be substantially equivalent to state 120 and no z-order changes among a set of active windows 112 need occur from state 120, 130, 140, 150 other than a temporary presentation of abbreviated interface 118 within desktop 110.

It should be noted that the taskbar 114, although shown at a bottom of the desktop 110 is not so limited. In one embodiment, the taskbar 114 can be implemented on the top or the side of desktop 110. In one embodiment, the taskbar 114 can be selectively and automatically hidden on the desktop 110, where it is only shown when a user positions a pointer near a corner of the desktop for M seconds.

In one contemplated embodiment, the taskbar elements 115, 116 need not be connected to a taskbar 114 per se. That is, another graphical user interface (GUI) artifact can be utilized to show which application instances are currently active in the desktop 110. This GUI artifact can be used for all active applications, or can be specific to only instances of one or more communication applications. For example, an always-on-top menu bar can appear on the desktop 110, which shows an icon and or other GUI element that is functionally equivalent to the task bar element 116 for purposes of this disclosure. In other words, if a user hovers (or performs some other equivalent user-triggered action 162) over an always-on-top GUI element 116 (regardless of whether it is a taskbar element or not) abbreviated element 118 can appear, as shown by and described for interactive state 140.

Figure 2:
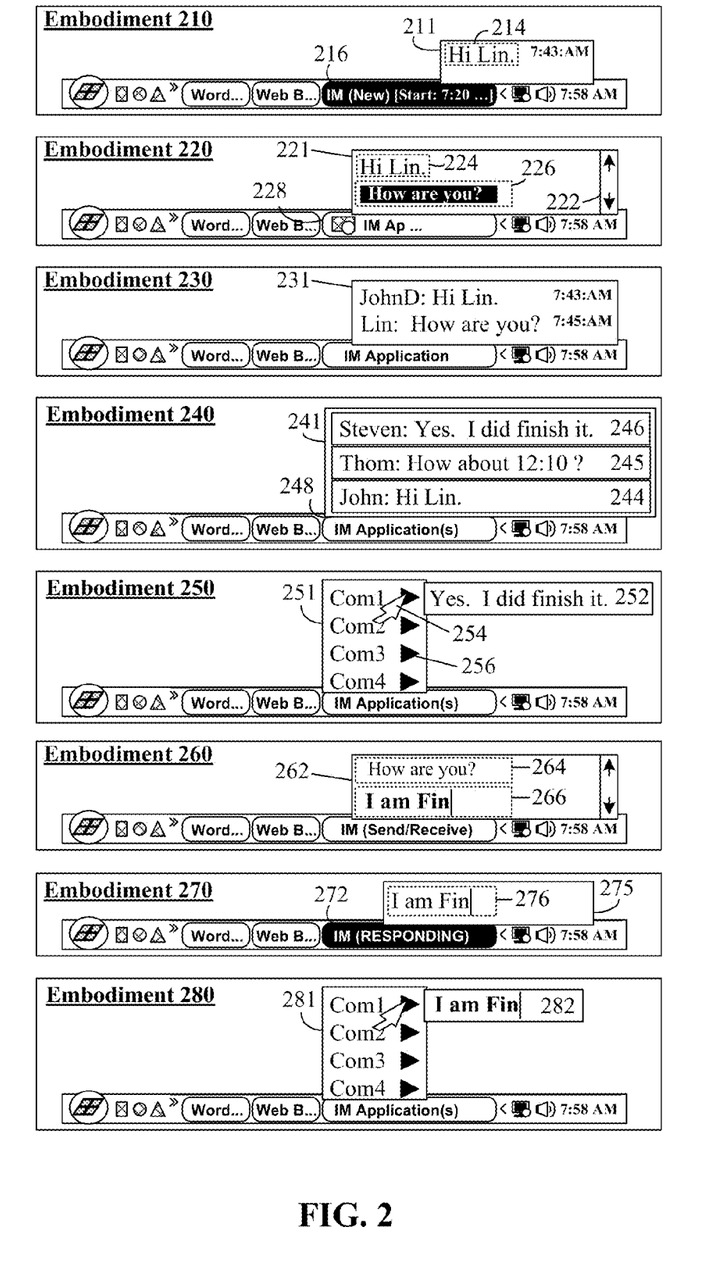
FIG. 2 shows multiple different embodiments for an abbreviated communication interface in accordance with an embodiment of the disclosure.

FIG. 2 shows multiple different embodiments 210, 220, 230, 240, 250, 260, 270, 280 for an abbreviated communication interface in accordance with an embodiment of the disclosure. Each abbreviated interface 210, 220, 230, 240, 250, 260, 270, 280 can represent a specific implementation of abbreviated interface 118. Embodiments 210, 220, 230, 240, 250, 260, 270, 280 are not intended to be exhaustive or comprehensive and other implementation arrangements are contemplated.

Embodiment 210 shows an abbreviated interface 211 where only new messages are shown. That is, old messages, which have been previously read are not shown. In one embodiment, presentation of a message 214 within abbreviated interface 211 for a duration (e.g., 3 seconds) can result in a status update for that message from unread-to read. Thus, a subsequent activation of abbreviated interface 211 can hide the message 214, assuming it is marked as read in accordance with established criteria.

Embodiment 220 shows an abbreviated interface 221 that presents new (unread) messages 224, as well as old (read) messages 226. A visually distinct presentation of the two types of messages 224, 226 can optionally exist. For example, unread messages 224 can be presented in a different color from read messages 226. In another example, unread messages 224 can be presented in a different typeface or larger font from read messages 226. Abbreviated interface 221 can include vertical 222 and/or horizontal (not shown) scroll bars.

Embodiment 230 shows that an abbreviated interface 231 need not include unread messages, but may contain only messages that have been previous read.

Embodiment 240 shows that an abbreviated interface 241 can present content from multiple different active communication sessions. This can be a natural presentation mechanism for toolbar elements that are categorically grouped together on a display. That is, taskbar element 248 can represent three different active instances of a common chat application. Section 244 of the abbreviated interface 241 can correspond to one of the active chat application instances; section 245 can correspond to another of the active chat application instances; and, section 246 can correspond to yet another of the active chat application instances. In embodiment 240 a number of shown sections 244-246 need not equate to a number of active instances. For example, in one embodiment, only those instances having at least one unread messages will be displayed as a section 244-246 when the abbreviated interface 241 is activated.

In embodiment 250, different active communication instances (Com 1, 2, 3, and 4) can be shown as expandable menu elements, where a selection of an instance shows an abbreviated interface 252 specific for that communication instance. More specifically, the main abbreviated interface 251 can show which communication sessions are currently active. Each session can have an expansion icon 256 beside it. When a user positions a pointer 254 over the expansion icon 256, interface 252 can dynamically appear. This interface 252 can disappear when a user moves the mouse pointer 254 away from the related expansion icon or interface 252 region.

Embodiment 260 shows that an abbreviated interface 262 can permit users to both view communication messages 264 as well as respond 266 by entering outgoing messages. In one embodiment, when the abbreviated interface 262 is presented in a desktop typed content will be interpreted as a reply message 266, which is sent upon pressing an ENTER key of a keyboard. Note, use of keyboard input for an outgoing message can be simplistic to implement, as the abbreviated interface may be listed in a z-order table as having focus, as indicated by interactive state 140.

Embodiment 270 shows an abbreviated interface 275, which is only for outgoing communications 276 and that does not necessarily display received messages. In one contemplated implementation, two different abbreviated interfaces can be presented, one for outgoing communication only (embodiment 270) and another for displaying received messages only (embodiment 210 or 220). In such an implementation, a user selection can determine whether an outgoing abbreviated interface (embodiment 270), an incoming abbreviated interface, or both are presented upon a desktop. For instance, when a user hovers a pointer over a task element 272 for N seconds, an incoming abbreviated interface (embodiment 210) can be presented; when a user depresses CONTROL when a pointer hovers over a task element for N seconds—an outgoing abbreviated interface (embodiment 270) can be presented; and, when a user depresses ALT when a pointer hovers over a task element for N sections—a combined abbreviated interface (embodiment 260) can be presented (or both an incoming and outgoing abbreviated interfaces can be concurrently presented within a desktop).

Embodiment 280 shows an abbreviated outgoing interface 281 similar to incoming abbreviated interface 251. In embodiment 281, different active communication sessions can be displayed as expandable menu items, where outgoing messages can be typed in an expanded interface 282 related to a specific active communication instance.

Any number of graphical user interface indicators can be used to apprise a user that a new unread message has been received by an active communication application that lacks current focus. In one embodiment, for example, a text indicator (item 216) can be added to a task bar element. The task bar element can also be highlighted or change color (item 216, 272) to indicate an existence of a new, unread message. In another embodiment, an icon or other graphic (item 228) can change. Other indicators (or none, as showing an incoming message indicator is optional or non-existent in some embodiments of the disclosures) can also be used. For example, coloration (transparency value, etc) of a partially exposed window (window 113) associated with a communication application can change to indicate an existence of a new unread message. Further, in one embodiment, different indicators can be used and/or added to the disclosure to denote different levels of urgency associated with incoming unread messages.

Figure 3:
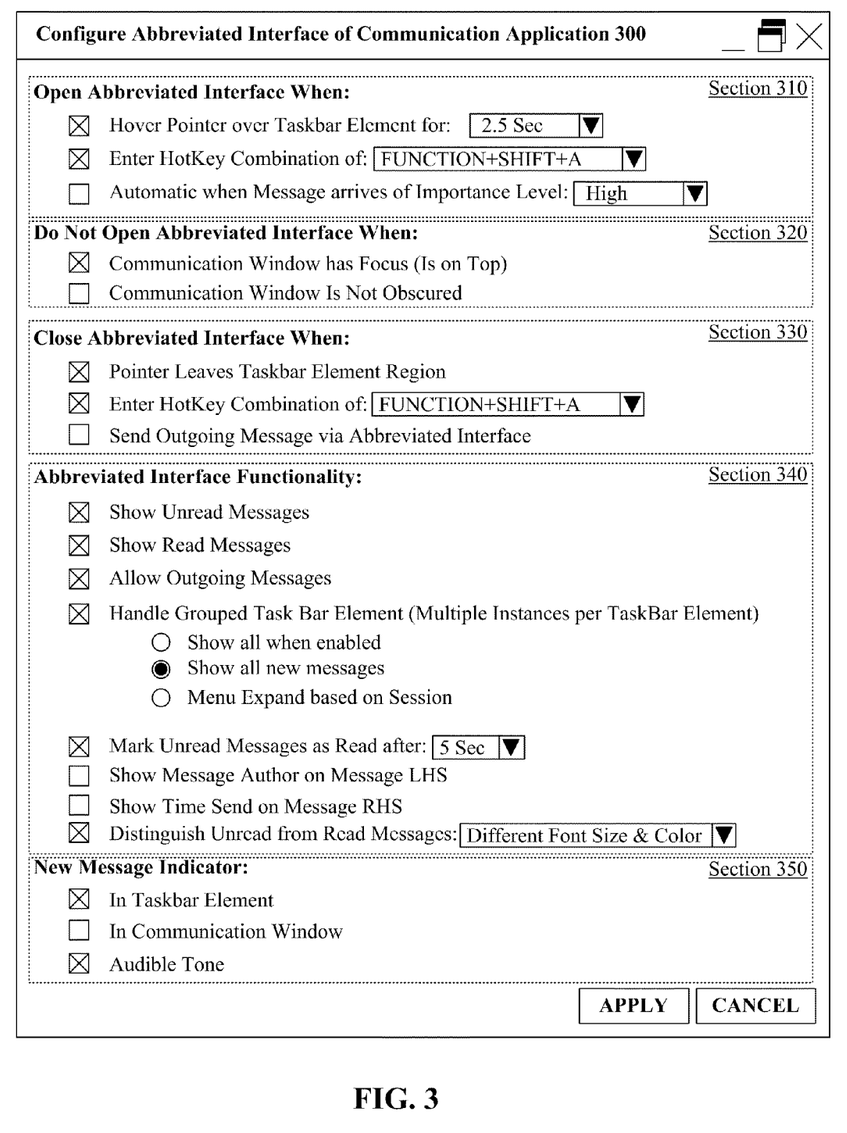
FIG. 3 shows a sample user configuration interface for controlling behavior of an abbreviated interface in accordance with the disclosure.

FIG. 3 shows a sample user configuration interface 300 for controlling behavior of an abbreviated interface in accordance with the disclosure. A number of configurable settings are contemplated, a few of which are explicitly shown in configuration interface 300. Derivatives and elaborations of the detailed settings are contemplated.

As shown in section 310, a number of options for determining when an abbreviated interface is open can be configured. For example, an interface option can open after a mouse pointer hovers over a taskbar element for a duration. A configurable hot-key combination can open the abbreviated interface. In one embodiment, the abbreviated interface can be opened when an important message arrives.

As shown in section 320, a number of user configurable conditions can be established that prevent an abbreviated interface from being presented even if conditions detailed in section 310 are satisfied. For example, an abbreviated interface can be configured not to open when a corresponding communication window has focus. This communication window a primary interface of an active communication application instance, which the abbreviated interface is also interactively linked to. In another example, the abbreviated interface may not be open-able when the communication window is visible (not obscured by other windows). This setting may assume that the communication window is not minimized.

As shown in section 330, the abbreviated interface can be closed when any of a variety of configurable conditions occurs. For example, when a desktop pointer leaves a taskbar element region (or abbreviated interface region), the abbreviated interface can be closed/hidden. A hot-key combination can be used to close the abbreviated interface. The abbreviated interface can be automatically closed after a configurable duration (not shown). In one embodiment, the abbreviated interface can automatically close when an outgoing message is sent from the configuration interface.

As shown by section 340, functionally of the abbreviated interface can be adjusted by a user. For example, a user can selective show/hide unread messages and read messages. A user can also permit outgoing message through the abbreviated interface or not. In one embodiment, a set of options for handling grouped task bar elements (for multiple communication application instances) can be provided. For example, a user can choose to show all messages (e.g., embodiment 240), to show all new messages from any active communication session, or to show a menu expanded view (e.g., embodiment 250, 280) of the different communication sessions.

Other configurable behavior from section 340 can include marking unread messages as read after they are presented within the abbreviated interface for a configurable duration. Further, message author information can be selectively shown or hidden. A time that a message was sent can also be selectively shown or hidden. Different configurable mechanisms can be used to distinguish read and unread messages appearing in the abbreviated interface.

As shown by section 350, different configurable ways can be used to alert a user of arrivals of new messages and/or an existence of unread messages. For example, a taskbar element can be changed when an unread message exists. Changes can also be made to the communication window associated with the communication instance (e.g., changing title bar color, window transparency level, border color or width, and the like) to indicate new messages and/or an existence of unread messages. In another example, a distinctive audible tone can be used.

Figure 4:
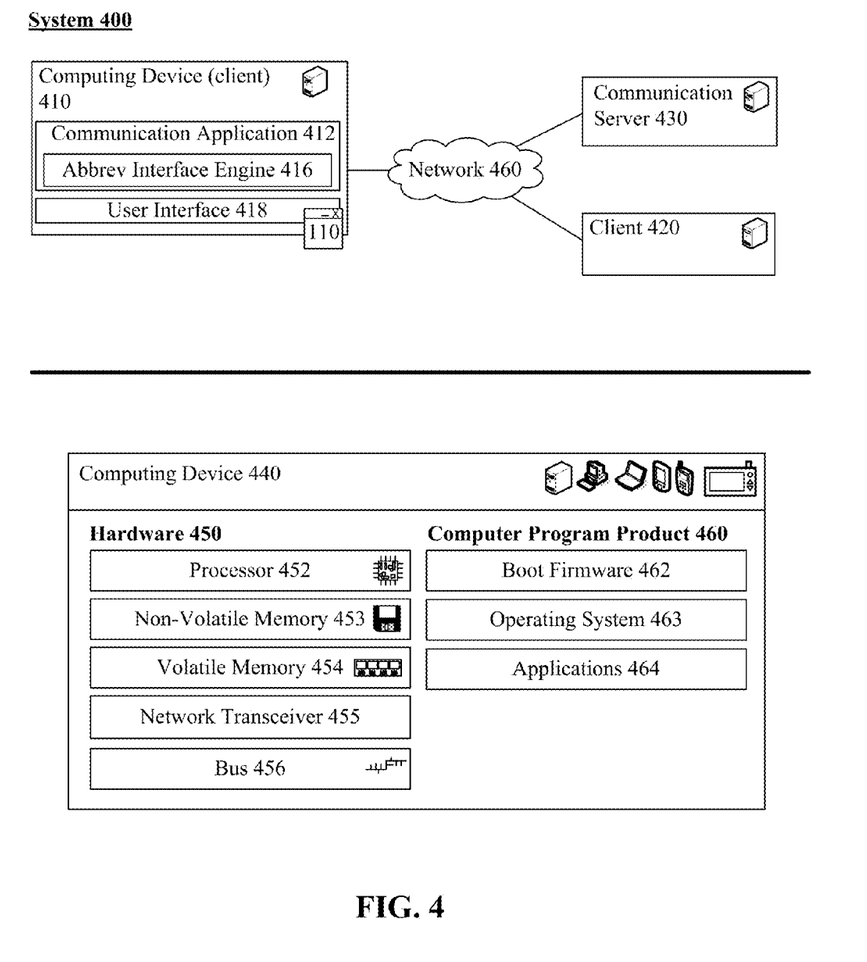
FIG. 4 is a schematic diagram of a system permitting real-time messaging in accordance with an embodiment of the disclosure.

FIG. 4 is a schematic diagram of a system 400 permitting real-time or near real-time messaging in accordance with an embodiment of the disclosure. In system 400, two or more clients 410, 420 can be communicatively linked to each other via network 460. An optional (depending on communication mechanism used) communication server 430 can also be connected to network 460. Digitally encoded messages can be exchanged among the computing devices 410, 420, 430.

Computing device 410 can function as a client device. Device 410 can include one or more communication applications 412, such as an instant messaging application, a chat application, a wave (e.g., GOOGLE WAVE) application, a voice over internet protocol (VoIP) application with transcription capabilities, a video teleconferencing application, an email application, a co-browsing application, a virtual meeting application, and/or other type of communication application though which text exchanges can occur in real-time or near real time. A user interface 418 of device 410 can include a desktop 110, which is able to present an abbreviated interface for the communication application 412. Client 420, which client 410 communicates, can include a communication application that lacks the abbreviated interface or can be enhanced to include the abbreviated interface. In other words and in one embodiment, computing device 410 that is enhanced with an abbreviated interface can interact with standard, unmodified remote communication clients 420 and servers 430.

In one embodiment, client-side programmatic instructions can enable functionality of the abbreviated interface, as shown by abbreviated interface engine 416. In another embodiment, server side (communication server 430) code and/or a combination of client and server code can implement abbreviated interface functionality.

For example, computing device 410 can include a browser, within which a communication application resides (controlled by Web server provided content). A separate browser pop-up can selectively be activated, which functions as the abbreviated interface for a communication application instance. Thus, the abbreviated interface (in one embodiment) can be a browser interface that renders markup (specific to the abbreviated interface) provided by a Web server (e.g., communication server 430).

Various components of system 400, such as items 410, 420, 430 can include operable components as shown by computing devices 440, which can include hardware 450 and computer program products 460. The computing devices 440 can be general purpose computing devices, such as personal computers, smart mobile phones, servers, or in-vehicle computers. The devices 440 can also be special purposed devices specifically manufactured/constructed for a tailored purpose. A special purposed device can have unique hardware, electronic boards, firmware, etc., which is not able to be easily modified by software and used for a different purpose. In various embodiments, devices 440 can be implanted as stand-alone devices, as virtual devices, as distributed devices, as cooperative devices, and the like.

Hardware 450 can include a processor 452, nonvolatile memory 453, volatile memory 454, network transceiver 455, and other components linked via a bus 456. The computer program products 460 can include programmatic instructions that are digitally encoded in a memory (e.g., memory 453, 454) and able to be executed by the processor 452. Computer program products 460 include boot firmware 462, (e.g., basic input/output system (BIOS)), an operating system 463 (i.e., special purposed devices can be optimized so an operating system 463 is merged with applications 464), and applications 464. The operating system 463 can include mobile device operating systems, desktop operating systems, server operating system, virtual operating systems, and/or distributed operating systems.

Figure 5:
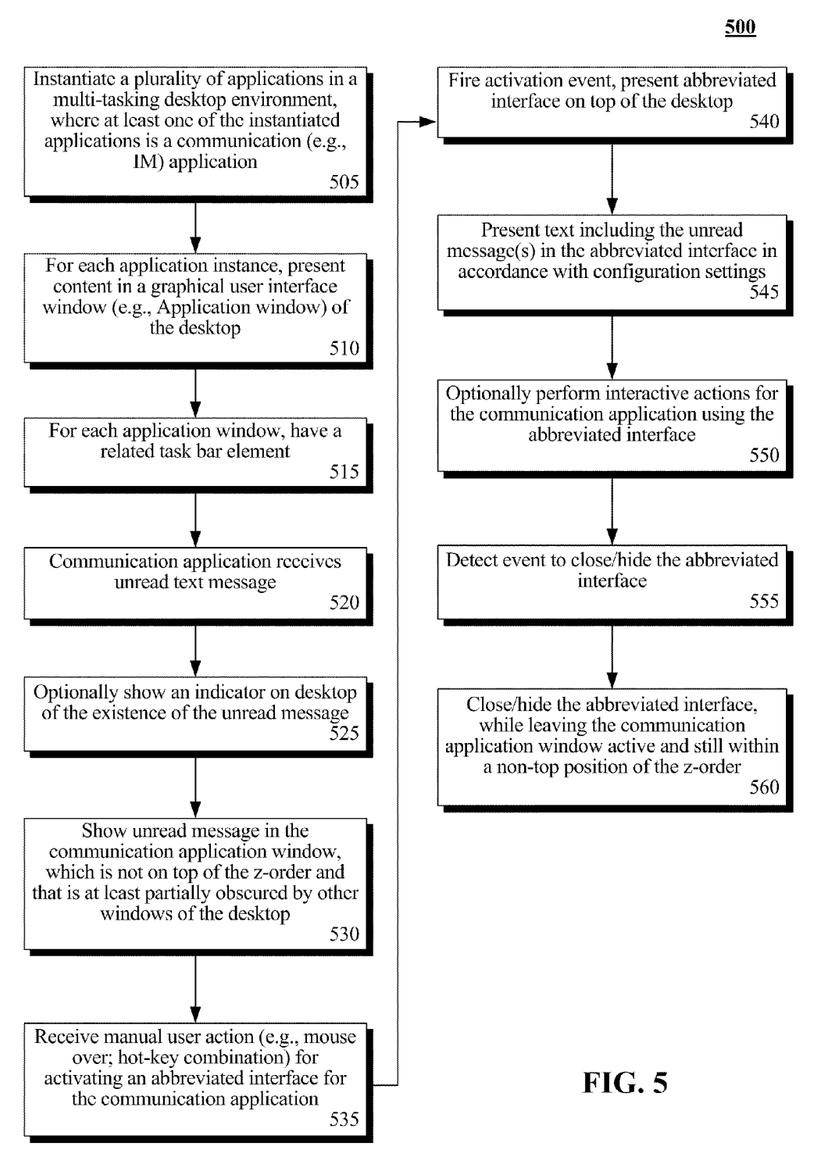
FIG. 5 is a flow chart for a method for interacting with a communication application via an abbreviated interface in accordance with an embodiment of the disclosure.

FIG. 5 is a flow chart for a method 500 for interacting with a communication application via an abbreviated interface in accordance with an embodiment of the disclosure. The method 500 can be performed in context of the system of FIG. 4 and/or the interfaces of FIG. 1 and FIG. 2.

The method 500 can begin in step 505, where a plurality of applications can be instantiated in a multi-tasking desktop environment. At least one of the instantiated applications can be a communication application, such as an IM application or a chat application. Other applications can include a word processor, a Web browser, a file manager, a spreadsheet application, a presentation application, and the like. Multiple instances of a common type of application can be instantiated at the same time. Instantiating multiple instances of the same application can either place each instance within the same desktop window (with a selection mechanism to toggle between different documents/spreadsheets/IM sessions, etc.) or within multiple different desktop windows.

Regardless, for each application instance, content can be presented within a graphical user interface (GUI) window (referred to as an application window) of the desktop, as shown by step 510. Each application window can have a related task bar element, as shown by step 515. In one situation, a one-to-one correspondence can exist between task bar elements and active application instances. In another, a single task bar element can exist for multiple application instances.

In step 520, the communication application can receive an unread text message. In optional step 525, an indicator can be shown on the desktop that visually depicts an existence of a new unread message. Indicators can include, for example, text descriptions of a new message (appearing in the task element), an icon (appearing in the task element) indicating a new message, a change of task-element color, highlighting, font, a change of communication application window appearance, an audible indication, and the like.

It should be noted that the unread message can be presented within the communication application window, which is open (or active—it can be minimized) on the desktop, as shown by step 530. The communication application window have a z-order position other than on-top (i.e., it can lack focus and other ones of the active application windows can be on top of the communication application window). The communication application window may be at least partially obscured by other windows of the desktop. Step 530 emphasizes that the communication application window can remain a primary interface for the communication application instance and can retain normal functionality regardless of the existence (or lack thereof) of an abbreviated interface.

In step 535, a manual user action can be received for activating the abbreviated interface for the communication application. For example, a GUI pointer can be positioned over a taskbar element for a designated time period, which causes the abbreviated interface to be activated. In another example, a hot-key combination can be used to activate the abbreviated interface. In step 540, the activation event can fire and the abbreviated interface can be placed on top of the desktop.

In step 545, text can be presented within the abbreviated interface, which may include the text of the unread message. In step 550, additional interactive actions can be performed using the abbreviated interface. In one embodiment, for example, outgoing messages can be entered in the abbreviated interface. In another embodiment, read messages can also be presented in the abbreviated interface.

In step 555, an event can be detected to close/hide the abbreviated interface. For example, a GUI pointer can be moved from a region of the taskbar element or abbreviated interface, which causes the abbreviated interface to disappear. In step 560, the abbreviated interface can be closed/hidden from the desktop. Closing the abbreviated interface leaves the communication application instance and application window active. Further, the communication application window can remain in its z-order position relative to other active windows of step 505. Thus, the communication application window can be in a non-top position of the z-order (e.g., it lacks focus) once the abbreviated interface is closed or hidden.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for presenting text messages comprising:

visually changing a taskbar element for a communication application in a graphical user interface environment upon receiving at least one previously unread text message at the communication application, wherein said graphical user interface environment comprises a plurality of different application windows each corresponding to an active application instance, wherein one of said application windows is a communication window for an instance of the communication application which permits real-time communications over a network between at least two people, wherein the communication window is not on top of a z-order of the graphical user interface environment;

detecting a manual user action made within the graphical user interface environment corresponding to the taskbar element for the communication application;

responsive to said manual user action, displaying an abbreviated user interface next to a task bar element for the communication application instance, wherein the abbreviated user interface has focus and is placed on top of the z-order of the graphical user interface environment, wherein the abbreviated user interface is a small-footprint interface relative to the communications window, wherein said abbreviated user interface lacks interface elements of the communications window, wherein said abbreviated user interface is not a thumbnail of the communication window, wherein and wherein said abbreviated user interface is concurrently active with the communications window and provides a non-comprehensive subset of functionality compared to functionality of the communications window including allowing entry of text in the communication application window through the abbreviated user interface;

presenting the at least one previously unread text message of the communication application instance within the abbreviated user interface without altering the z-order of the communication window relative to the other ones of the plurality of different application windows;

when the unread text message is presented within the abbreviated user interface for at least a previously determined duration, marking the text message as read for the application instances, which causes the text message to be marked as read within the communication interface window; and detecting a close event to close or hide the abbreviated application window; and responsive to the close event, removing the abbreviated user interface from the graphical user interface environment, wherein upon removal the z-order of the plurality of different application windows remains unchanged from a state existent before the manual user action was detected.

2. The method of claim 1, wherein the manual user action comprises positioning a pointer over a task bar element associated with the communication application instance, and wherein the close event is triggered responsive to a user moving the pointer away from a region of the task bar element and the abbreviated user interface.

3. The method of claim 2, wherein the abbreviated user interface is a flyover window lacking buttons for minimizing, maximizing, and closing itself.

4. The method of claim 3, wherein the abbreviated user interface is a rectangular region comprising only text content.

5. The method of claim 1, wherein the manual user action comprises entering a hot-key combination corresponding to showing the abbreviated user interface, and wherein the close event is triggered by a hot-key combination corresponding to not-showing the abbreviated user interface.

6. The method of claim 1, further comprising: presenting both read and unread messages within the abbreviated user interface, wherein a text display characteristics differs between the read and unread messages permitting a user to visually distinguish between read and unread messages presented within the abbreviated user interface.

7. The method of claim 1, further comprising: while the abbreviated user interface is open, receiving key presses from a keyboard;
placing characters corresponding to the key presses in the abbreviated user interfaces as content for an outgoing message; and
upon a detection of an ENTER key press, sending the outgoing message to communications involved in a communication session for the communication application instance.

8. The method of claim 1, wherein the communication application instance is a text messaging application instance, wherein the text messaging application instance permits a plurality of remotely located individuals using different computing devices to convey digitally encoded text messages to each other via a network.

9. The method of claim 1, wherein the close event comprises a message sent event.

10. A computer program product for presenting text messages, the computer program product comprising: a non-transitory computer readable storage medium having computer usable program code embodied therewith, the computer usable program code comprising:
computer usable program code operable to detect a manual user action made within a graphical user interface environment of a computing device, wherein said graphical user interface environment comprises a plurality of different application windows each corresponding to an active application instance, wherein one of said application windows is a communication window for an instance of a communication application, which permits real-time communications over a network between at least two people, wherein said communication window is not on top of a z-order of the graphical user interface environment;
computer usable program code operable to, responsive to said manual user action, display an abbreviated user interface next to a task bar element for the communication application instance, wherein the abbreviated user interface has focus and is placed on top of the z-order of the graphical user interface environment, wherein the abbreviated user interface is a small-footprint interface relative to the communications window, wherein said abbreviated user interface lacks interface elements of the communications window, wherein said abbreviated user interface is not a thumbnail of the communication window, and wherein said abbreviated user interface is concurrently active with the communications window and provides a non-comprehensive subset of functionality compared to functionality of the communications window;
computer usable program code operable to present at least one previously unread text message of the communication application instance within the abbreviated user interface without altering the z-order of the communication window relative to the other ones of the plurality of different application windows and to present a text entry to allow entry of text in the communication application window through the abbreviated user interface;
computer usable program code operable to, when the unread text message is presented within the abbreviated user interface for at least a previously determined duration, mark the text message as read for the application instances, which causes the text message to be marked as read within the communication window; and
computer usable program code operable to detect a close event to close or hide the abbreviated application window; and
computer usable program code operable to, responsive to the close event, remove the abbreviated user interface from the graphical user interface environment, wherein upon removal the z-order of the plurality of different application windows remains unchanged from a state existent before the manual user action was detected.

11. The computer program product of claim 10, wherein the manual user action comprises positioning a pointer over a task bar element associated with the communication application instance, and wherein the close event is triggered responsive to a user moving the pointer away from a region of the task bar element and the abbreviated user interface.

12. The computer program product of claim 10, further comprising:
computer usable program code operable to present both read and unread messages within the abbreviated user interface, wherein a text display characteristics differs between the read and unread messages permitting a user to visually distinguish between read and unread messages presented within the abbreviated user interface.

13. The computer program product of claim 10, further comprising:
computer usable program code operable to, while the abbreviated user interface is open, receive key presses from a keyboard;
computer usable program code operable to place characters corresponding to the key presses in the abbreviated user interfaces as content for an outgoing message; and
computer usable program code operable to upon a detection of an ENTER key press, send the outgoing message to communications involved in a communication session for the communication application instance.

14. A desktop of a graphical user interface environment of a computing device comprising hardware and computer program products running on the hardware to produce the graphical user interface, said desktop comprising:
a plurality of windows, each for a different application instance, wherein one of said plurality of windows is a communication application window for a communication application instance, wherein at least one window of the plurality is positioned on top of the communication application window within the z-order of the computer desktop; and
an abbreviated application interface for the communication application instance, which has a different graphical element layout than the communication application window, wherein said abbreviated application interface presents textual content of unread messages received by the communication application instance, wherein the abbreviated application interface is positioned on top of the plurality of windows within the z-order of the graphical user interface environment, wherein content presented within the abbreviated application interface is concurrently available within the communication application window, which is at least partially obscured by other ones of the plurality of windows being on top of the communication application window and to present a text entry to allow entry of text in the communication application window through the abbreviated user interface;
wherein presentation of an unread text message from the communication application window within the abbreviated application interface does not alter the z-order of the communication application window relative to the other ones of the plurality of windows, wherein when the unread text message is presented within the abbreviated application interface for at least a previously determined duration, the text message is marked as read, which causes the text message to be marked as read within the communication application window.

15. The desktop of claim 14, wherein said abbreviated application interface lacks graphical menus, user selectable buttons, and toolbars.

16. The desktop of claim 15, wherein the abbreviated application interface lacks textual content for read messages of the communication application instance.

17. The desktop of claim 15, wherein the abbreviated application interface comprises an input field for entering outgoing text messages to be sent to others via the communication application instance.

18. The desktop of claim 15, wherein each discrete message of the presented textual content is associated with a time at which the message was received by the communication application instance, wherein the abbreviated application interface is user configurable for one of displaying and hiding the time.

19. The desktop of claim 15, wherein the abbreviated application interface is presented within the graphical user interface environment next to a communication taskbar element for the communication application instance, wherein a selection of the communication taskbar element results in the communication application window being placed on top of the z-order of the graphical user interface environment and being given focus.

20. The desktop of claim 19, wherein the communication taskbar element is a single taskbar element for a plurality of different active communication application instances, wherein the textual content presented within the abbreviated application interface comprises text from messages from different ones of the different active communication application instances.

21. The desktop of claim 14, wherein the communication application instance is a text messaging application instance, wherein the text messaging application instance permits a plurality of remotely located individuals using different computing devices to convey digitally encoded text messages to each other via a network.

22. The desktop of claim 14, wherein the abbreviated application interface is user configurable to display a first abbreviated interface and a second abbreviated interface, wherein the first abbreviated interface displays only incoming messages and the second abbreviated interface displays only outgoing messages.

23. A communication application implemented within a computer program product digitally encoded in a non-transitory storage medium, wherein said communication application is operable to exchange real-time or near-real-time text based communications over a network with at least one remotely located devices, said communication application comprising:
 a communication application window operable as a graphical user interface for users to input text and to display text, where the input text and display text is text of the exchanged text based communications;
 an abbreviated user interface operable as a graphical user interface for users to view at least a portion of said display text, wherein said abbreviated user interface lacks interface elements of the communications application window, and wherein said abbreviated user interface is concurrently active with the communications application window and provides a non-comprehensive subset of functionality compared to functionality of the communications application window;
 code stored in a tangible storage medium operable to present the abbreviated user interface responsive to a manual action performed within a graphical user interface environment by a user of the graphical user interface environment and to present a text entry to allow entry of text in the communication application window through the abbreviated user interface; and
 code stored in a tangible storage medium operable to present an unread text message from the communication application window within the abbreviated user, wherein when the unread text message is presented within the abbreviated user interface for at least a previously determined duration, the text message is marked as read, which causes the text message to be marked as read within the communication application window.

24. The communication application of claim 23, wherein the abbreviated user interface is a flyover window lacking buttons for minimizing, maximizing, and closing itself, wherein the communication application window includes buttons for minimizing, maximizing, and closing itself.

25. The communication application of claim 23, wherein the code, upon detecting an occurrence of the manual action determines whether the communication application window is on top of a z-order of the graphical user interface environment, wherein the code only presents the abbreviated user interface responsive to the manual action when the communication application is not on top of the z-order of the graphical user interface environment.

* * * * *